(12) United States Patent
Wubben et al.

(10) Patent No.: US 6,910,663 B1
(45) Date of Patent: Jun. 28, 2005

(54) PECTINS AS FOAM STABILIZERS FOR BEVERAGES HAVING A FOAM HEAD

(75) Inventors: Maria A. Wubben, Delft (NL); Albert Doderer, Zoetermeer (NL)

(73) Assignee: Heineken Technical Services B.V., ZD Amsterdam (NL)

( * ) Notice: Subject to any disclaimer, the term of this patent is extended or adjusted under 35 U.S.C. 154(b) by 0 days.

(21) Appl. No.: 08/776,321

(22) PCT Filed: Aug. 3, 1995

(86) PCT No.: PCT/NL95/00266
§ 371 (c)(1),
(2), (4) Date: Apr. 15, 1997

(87) PCT Pub. No.: WO96/04363
PCT Pub. Date: Feb. 15, 1996

(30) Foreign Application Priority Data

Aug. 4, 1994 (NL) .............................. 9401273

(51) Int. Cl.⁷ ................................................ C12C 3/00
(52) U.S. Cl. ............................ 246/16; 426/29; 426/600
(58) Field of Search ........................... 426/16, 29, 577, 426/592, 600, 28

(56) References Cited

U.S. PATENT DOCUMENTS

| 2,020,572 A | * | 11/1935 | Platt .............................. 536/2 |
| 2,233,574 A | * | 3/1941 | Baker et al. ................. 426/250 |
| 3,099,563 A | * | 7/1963 | Smith .......................... 426/384 |
| 3,222,181 A | * | 12/1965 | Hoelle et al. ............... 426/600 |
| 3,730,730 A | * | 5/1973 | Rigby .......................... 426/600 |
| 4,808,574 A | * | 2/1989 | Brekhman et al. ............. 514/23 |

FOREIGN PATENT DOCUMENTS

| EP | 243654 | * | 11/1987 |
| EP | 292034 | * | 11/1988 |
| EP | 426434 | * | 5/1991 |
| EP | 463696 | * | 1/1992 |
| GB | 1048912 | * | 11/1966 |
| GB | 1082284 | * | 9/1967 |
| SU | 685689 | * | 9/1979 |
| WO | 9315181 | * | 8/1993 |

OTHER PUBLICATIONS

Zymurgy, "Barley Wine, The King Kong of Beers", vol. 16, No. 3, Fall 1993, pp. 44–51.*

C. Papazian, The New Complete Joy of Home Brewing Avon Books, New York, 1991, page.*

The Practical Brewer, MBAA, Madison, Wisc., 1977, p. 139.*

H. D. Graham, Food Colloids, AVI Publishing, Westport Conn., 1977, pp. 418–437.*

Droszda et al, Kievski Tekh. Inst. Pischevoi Promyshlennosti, No 1, pp 21–25, 1974.*

* cited by examiner

*Primary Examiner*—Curtis E. Sherrer
(74) *Attorney, Agent, or Firm*—Young & Thompson

(57) ABSTRACT

The invention provides pectins as new foam stabilizers for (temporary) foam heads in beverages, in particular in beers, especially beers of the pilsner type. These foam stabilizers are preferably obtained from hops, which is a constituent that is inherent in beer and accordingly offers the advantage, among others, that the foam stabilizers need to have no negative effect on the taste of the beer. Preferably, the pectins are obtained from hop cones or bines. It may be advantageous to partially saponify (de-esterify) the pectins, in connection with the number of charged groups on the pectins. In addition, the invention provides methods for obtaining the pectins and beverages stabilized with the pectins according to the invention.

6 Claims, 9 Drawing Sheets

PECTINS AS FOAM STABILIZERS FOR BEVERAGES HAVING A FOAM HEAD

FIELD OF THE INVENTION

The invention relates to the use of pectins in the stabilization of foam heads of beverages such as beer.

In addition, the invention relates to methods for producing such pectins and beverages stabilized with such pectins.

DESCRIPTION OF RELATED ART

Pectins are polysaccharides occurring in particular in the cell walls of dicotylous plants. The main chain of pectins contains α-D-galacturonic acid, while residues may contain L-rhamnose, D-galactose, L-arabinose, D-xylose and L-fucose. Each type of plant, in principle even each variety, possesses type-specific pectins whose compositions differ from those of the pectins of other types/varieties.

Hitherto, pectins have been used in particular in jelly-like products such as confiture and other fruit-jelly products. The pectins used herein are generally isolated from apple pulp and citrus pulp (see for instance U.S. Pat. No. 4,943,443).

U.S. Pat. No. 5,008,254 describes pectins that are isolated from sugar beet pulp and can be used for improving various properties such as nutritional value and in many applications such as the improvement of consistency, non-hygroscopic adhesive, stabilizer of emulsions, etc.

In column 15 of the patent specification in question, the use of these pectins as a foam improver is mentioned, with the understanding that marshmallows and imitation whipped cream are involved here.

Of course, these permanent foams cannot be compared with the foam head of a beverage such as beer.

Beer differs from other beverages through, among other things, a persistent foam head.

Owing to the natural ingredients of beer and the specific know-how of the brewer, a foam of good quality can be obtained.

The most important properties of such a foam are:

compactness slow, regular settlement good adhesion to the wall of the glass formation of fine-meshed "clings" during the drying of the foam.

These parameters, which are of particular importance for the consumer's appreciation of the beer, can be determined relatively objectively by means of equipment that is available on the market.

To obtain a high-quality foam, a foam stabilizer is added to various beers.

In general, the substance montol is used, although cobalt salts and iron salts are used as well.

In a number of countries, the addition of such substances is not allowed, as they are not necessary for the preparation of beer and/or are not inherent to beer.

Montol is a polypropylene glycol alginate (a composition of β-D-mannuronic acid and α-L-guluronic acid having a molecular weight of between 30,000 and 200,000). This substance is isolated from algae. It is isolated in particular from the brown algae Laminaria digitata and Macrocystis pyrifera.

A known drawback of the use of montol, apart from the fact that it is not inherent in beer, are the chances of precipitate formation in the final product.

SUMMARY OF THE INVENTION

The invention provides a method for improving the stability of the foam head of beverages, wherein one or more pectins are added to the beverage before, during or after the process of its preparation.

DESCRIPTION OF THE PREFERRED EMBODIMENTS

Figure 1:
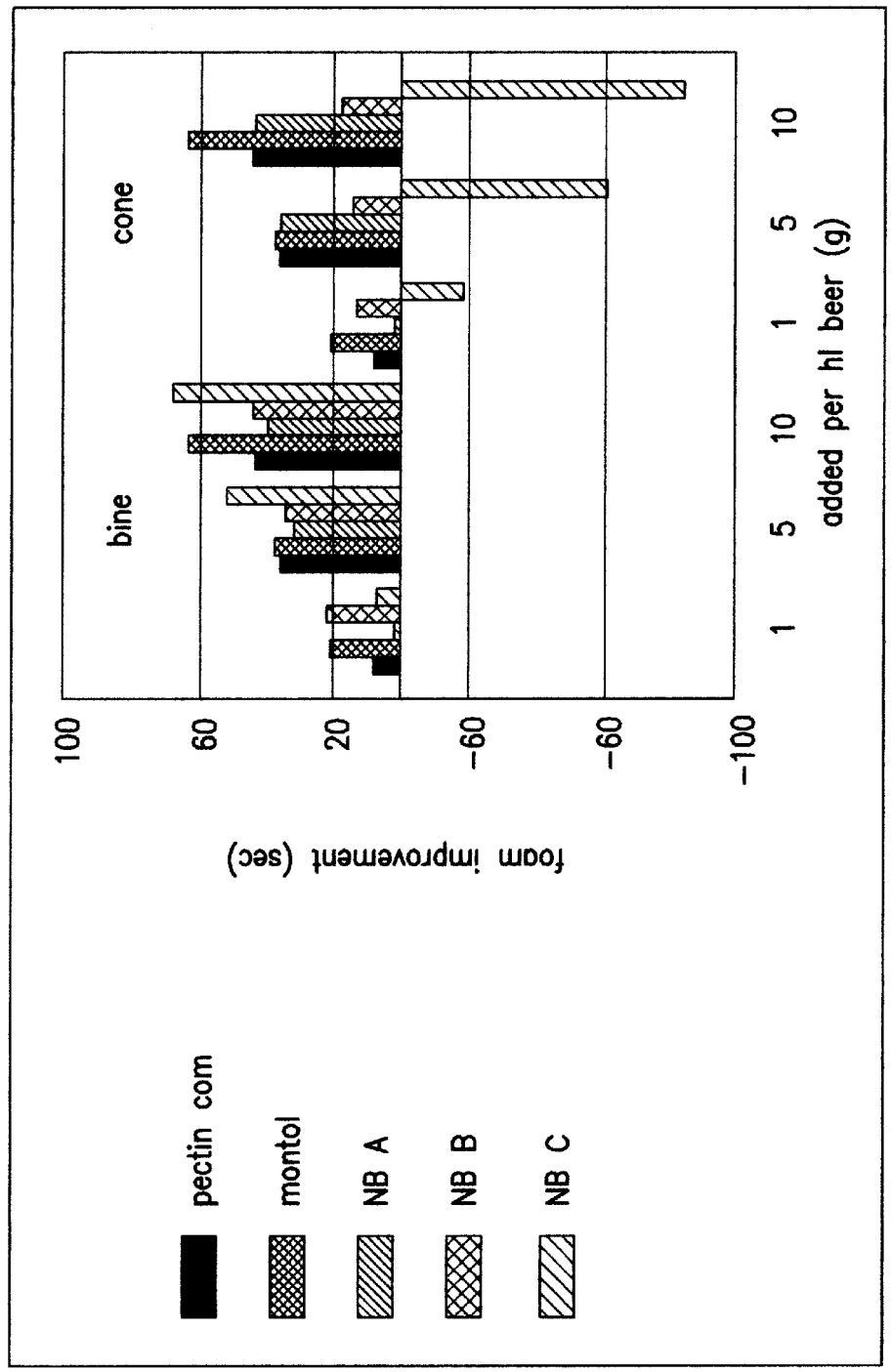
FIGS. 7-1 and 7-2 each show a representation of a chromatogram.

Preferably added are pectins that have been isolated or extracted from the hop plant or other necessary starting materials for beer, on account of the fact that these pectins are derived from an ingredient that is inherent in beer and hence Will not affect the taste properties, which could well be the case with commercially available pectins from, for instance, citrus fruits.

Although hops are added in the form of hop cones, pellets, hop concentrates or isomerized hop extract during the process of brewing beer, their Presence does not result in the presence of pectins from the hops with a foam-stabilizing action in the eventual beer, as the process conditions of the brewing process (for instance the high temperature at neutral pH during wort boiling) lead to the breakdown of the pectins, for instance due to, inter alia, the β-elimination reaction according to Albersheim (Albersheim et al., 1960) (the breaking of glycoside bonds next to carboxymethyl groups). Due to this breakdown, their foam-improving capacity is also lost.

Hence, U.S. Pat. No. 3,099,563, which relates to foam stabilizers for beer, starting from residual products of the brewing process, cannot relate to pectins from hops or other beer ingredients. It is not clear which substances are in fact prepared with the method according to this patent specification.

According to the present invention, it is preferred to start from pectins isolated from fresh hop parts or from by-products of the hop extraction.

Preferably, the pectins according to the present invention are obtained from the hop cones or the bines of the hop plant. The pectins do not need be isolated to a high purity, although this is in fact preferred, in particular because of the possible presence of undesired substances that may have a negative effect on the taste, the color or the foam stability of the eventual end product, such as for instance polyphenols.

The action of the pectins according to the invention is probably based on the same principle as the action of montol.

Pectins as well as alginates possess a charge in beer (as described by Benard et al. Ann. Fals. Exp. Chim., 1981), enabling them to start an interaction with beer proteins. This may lead to a more stable foam.

If this charge of the pectins is indeed relevant for the foam-stabilizing action thereof, it may be advantageous to subject the isolated pectins to a partial saponification/de-esterification reaction. The average normal degree of esterification of 70% can then be reduced to 40–50%.

In the above-referred publication by Benard et al., pectins that may be present are only mentioned as being interfacing during a montol determination, and nothing is mentioned about any function of those pectins.

The pectins according to the invention can be added at any desired moment from about 10 minutes before the end of the wort boiling (this is not critical) to the end of the preparation process. In any case, they have to be added late enough to prevent the above-mentioned breakdown from taking place to a large extent. Preferably, the pectins are added before the bright beer filtration, because any precipitates that may be present can be removed by means of the filtration. When, during the brewing process, a step known as posthopping (adding a hop preparation at the end of the wort boiling) is applied, the pectin preparation can suitably be added to this hop preparation.

The amounts of pectin that have to be added in order to achieve the improved stability can readily be determined by a skilled person. They will depend on, inter alia, the purity of the pectin preparation and the type of beer to which the preparation is added. In general, the amount of preparation to be added will be between 0.5 and 20 g/hl, preferably around 3 g/hl.

In principle, the invention is applicable to all types of beer for which a foam head is desired. The invention is in particular suitable for use in for instance beer of the pilsner type. (A bottom-fermented gold-colored beer having a characteristic hopped taste.)

According to the invention, with the pectins isolated from hops a foam stability is obtained that is at least as good as the foam stability obtained with montol, without the drawbacks attached thereto, and when the purity of the pectins is sufficiently high, even a surprisingly better foam stability is obtained.

The invention will be explained in and by the following examples.

EXAMPLE 1

Introduction

The stabilization of the foam with pectin is probably based on the fact that pectin has a charge in beer. As a consequence, it may form compounds in the surface of the foam films. Hops contain 1–3% (d.s.) pectin. Hence, the pectins were isolated from hops and compared with commercially available pectins from Quest International.

Results

When pectins are added to beer, an improvement of the foam stability can indeed be observed after incubation for 2 days by shaking of the bottle. The foam figures are given in Table 1 (Nibem meter).

TABLE 1

|  |  | foam stability (sec) |  | average | test minus contr. |
| --- | --- | --- | --- | --- | --- |
| Hop pectin | (1 g/hl) | 276 | 273 | 274 | 29 |
|  | 5 " | 266 | 285 | 275 | 40 |
|  | 10 " | 282 | 269 | 275 | 40 |
| Pectin | 1 " | 283 | 262 | 272 | 37 |
| (vis 200 ) | 5 " | 283 | 305 | 289 | 54 |
|  | 10 " | 300 | 301 | 300 | 65 |
| Pectin | 1 " | 275 | 271 | 273 | 38 |
| (200816) | 5 " | 289 | 288 | 288 | 53 |
|  | 10 " | 298 | 304 | 300 | 65 |
| Control | 0 " | 225 | 245 | 235 | — |

1. Pectin exhibits good foam stabilizing properties in dosages of 5 g/hl in beer.
2. The foam-stabilizing properties of hop constituents are based not only on those of the bittering substances, but also on those of the pectins from hops.

Method

From a water extract of hop cones, pectins (1–3% d.s.) can be extracted according to the following method:

1. Incubate the extract with 0.3 N HCl at 70°for 4 hours. Then centrifuge after the pH has been adjusted to 3 with $Na_2CO_3$.
2. Next, add $Al_2(SO_4)_3$ and adjust the pH to 4 with $Na_2CO_3$. Separate the precipitate by centrifugation.
3. Next, add $Al_2(SO_4)_3$ and adjust the pH to 4 with $Na_2CO_3$. Separate the precipitate by centrifugation.

The pectins were added to bottles of beer in dosages as indicated in Table 1. After this, the bottles were shaken slowly at room temperature for two days. Finally, at the service laboratory, the foam stabilities were determined in duplicate.

EXAMPLE 2

2.1 Material

Exploratory experiments were conducted with Northern Brewer A, B and C (Dutch hops). The experiments were repeated with four other varieties (German hops). Northern brewer A and B originate from the same location, Northern brewer C comes from another location.

TABLE 2

| Variety of hop | Hop cones | Bines | Waste |
| --- | --- | --- | --- |
| Northern brewer A | x | x | — |
| Northern brewer B | x | x | — |
| Northern brewer C | x | x | — |
| Hersbrücker | x | x | x |
| Aroma perle | x | x | x |
| Northern brewer | x | — | x |
| Brewers gold | x | x | x |

For comparison, the foam stabilization experiments were also conducted with commercial citrus pectin (DE 67%) and montol. For the foam experiments, reference pilsner beer was used.

2.2 Methods

1) Pectin Extraction

The separate parts of the hop plant (bines, cones, leaves and the waste) were extracted with water (acidified to pH 2) to isolate pectin. The procedure followed is set forth in annex 1.

2) Determination of the AUA Content and Degree of Esterification

The purity of the isolated pectin fractions was determined by means of a titration/saponification/titration. JECFA: Compendium of food additive specifications, volume 2, Food and Agriculture Organization of the United Nations, Rome 1992, p 1055.

The content of AUA (anhydrogalacuronic acid) can thus be determined. Thus, the degree of esterification (DE) of the fractions was determined as well.

3) Determination of the Foam Influence of Pectin

The purified pectin fractions were added to beer to determine the influence thereof on the foam stability. The procedure is described in annex 2.

2.3 Results 2.3.1 Dutch Hops

The Dutch hop plants were harvested at two points of time to investigate variation in the maturity of the plant (time 1 is the proper moment of harvesting; the hop cones have the required maturity (plant A); time 2 is approx. 3 weeks after the proper time of harvesting (the leaves, cones and bines are withered (plants B and C)). Table 3 shows the yields of the extracted pectin fractions. The leaves of all plants gave too low a yield of pectin, as a consequence of which they are not further considered separately.

TABLE 3

Yields of extraction from the Dutch hop plants

| Pectin | weighed-in (g) | volume extraction (ml) | pectin weight (mg) | % extracted |
|---|---|---|---|---|
| Bine A | 20 | 100 | 440 | 2.2 |
| Bine B | 90 | 500 | 310 | 0.34 |
| Bine C | 610 | 2600 | 3500 | 0.57 |
| Cones A | 30 | 250 | 440 | 1.2 |
| Cones B | 75 | 600 | 520 | 0.69 |
| Cones C | 160 | 1300 | 1400 | 0.88 |

At the proper time of harvesting, more pectin can be isolated from the bines and cones than approx. 3 weeks after this time. Particularly the bines are sensitive to the time of harvesting (the extracted pectin content decreases by 75–85%). The purity of the fractions also decreases (% AUA from 80 to 70). The degree of esterification of the cones and bines remains equal in time and is 75% for both.

FIG. 1 shows the influence of the hop pectins on the foam stability of beer in comparison with commercial citrus pectin (DE 67%) and montol (in annex 3 the results are given in tables). For dosing the pectin fractions 100% purity was assumed. However, the AUA content of bine A and cone A is 80%, the AUA content of bines B and C and cones B and C is 70%. For the comparison with montol, this should be taken into account. This was not corrected for in the experiments with the Dutch hops, but it was corrected for in the experiments with the German hops.

Up to a content of 5 g/hl, the foam-stabilizing action of bine/cone pectin (A and B) is equal to the action of montol. At higher concentrations, the action of pectin lags behind when compared with montol (partly due to the 70–80% purity of the fractions). Bine/cone pectin extracted from plant C shows a different pattern. The cone pectin has a negative effect on the foam stability, while the bine pectin has a greater positive effect on the foam stability in comparison with bine pectin of plant A and B. It is possible that in the case or the cone pectin (plant C) more foam-negative components (such as polyphenols) have been extracted along.

2.3.2 German Hops

From the bines, cones and the waste of four German hop varieties, pectin was extracted as well.

The yields are given in Table 4. In the experiments, the leaves are not considered on account of the low pectin yields in Dutch hop plants.

Waste is a mixture of bines, leaves and cones such as it is left in the field after harvesting.

TABLE 4

Yields of the pectin extraction from the German hop plants

| Pectin | weighed-in (g) | volume extraction (ml) | pectin weight (mg) | % extracted |
|---|---|---|---|---|
| Bine 1 | 250 | 1250 | 2.64 | 1.06 |
| Bine 2 | 250 | 1250 | 5.46 | 2.18 |
| Bine 4 | 250 | 1250 | 4.99 | 2.00 |
| Cones 1 | 165 | 1750 | 4.36 | 2.64 |
| Cones 2 | 165 | 1750 | 3.26 | 1.98 |
| Cones 3 | 165 | 1750 | 2.36 | 1.43 |
| Cones 4 | 150 | 1750 | 3.01 | 2.00 |
| Waste 1 | 250 | 1750 | 4.04 | 1.62 |
| Waste 2 | 250 | 1750 | 3.75 | 1.50 |
| Waste 3 | 250 | 1750 | 6.73 | 2.69 |
| Waste 4 | 250 | 1750 | 4.78 | 1.91 |

Figure 2:
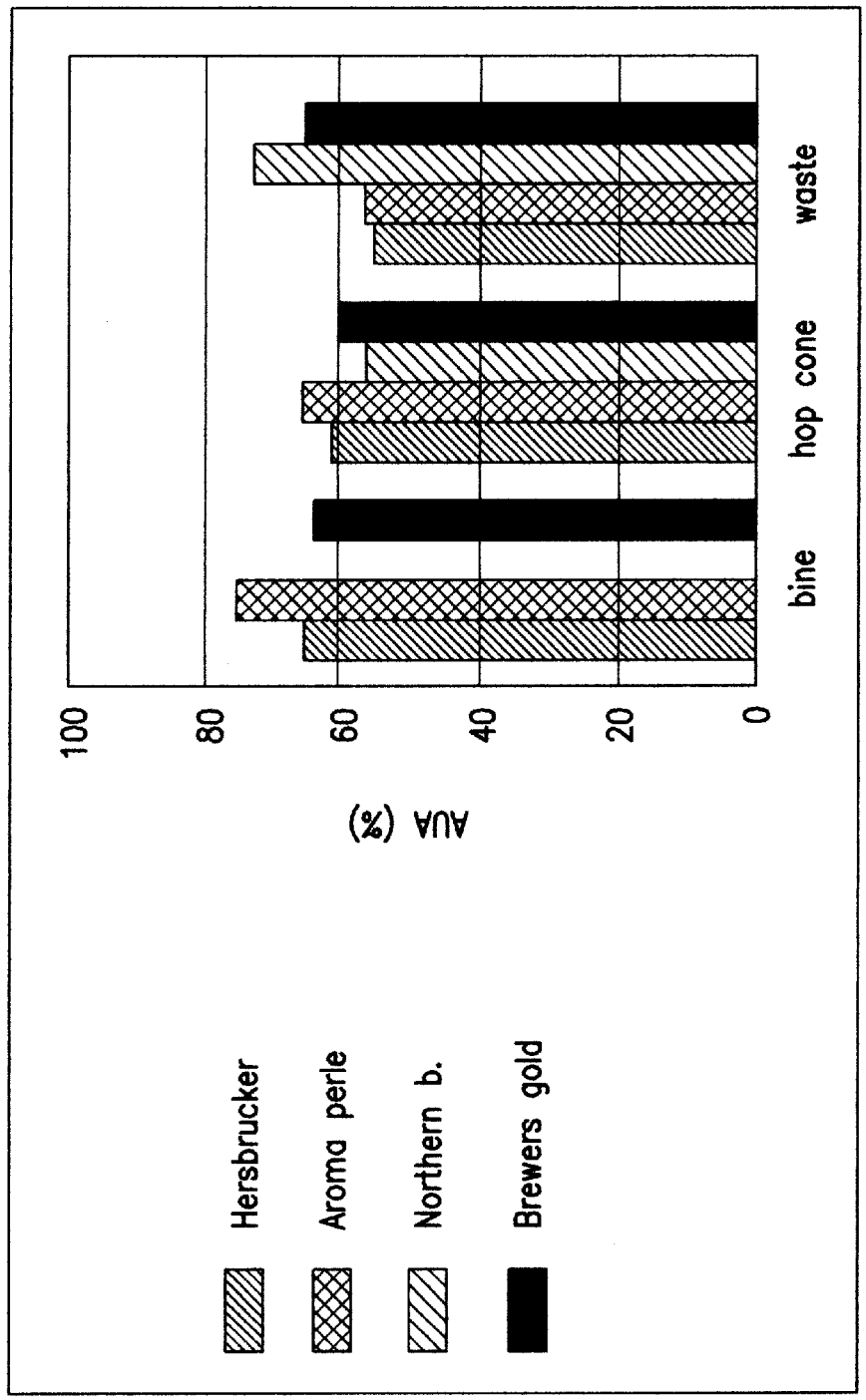

From the German hops a greater pectin fraction is extracted than from the Dutch hops. However, the purity of these preparations is lower than for the Dutch hops. This is probably due to the fact that for the German hops more material was purified at the same time. The AUA contents are shown in FIG. 2 (in annex 6 the results are shown in tables).

The average purity of the fractions is around 60%. The degree of esterification of all isolated pectin fractions is around 70% (in annex 6 the results are shown in tables).

Figure 3:
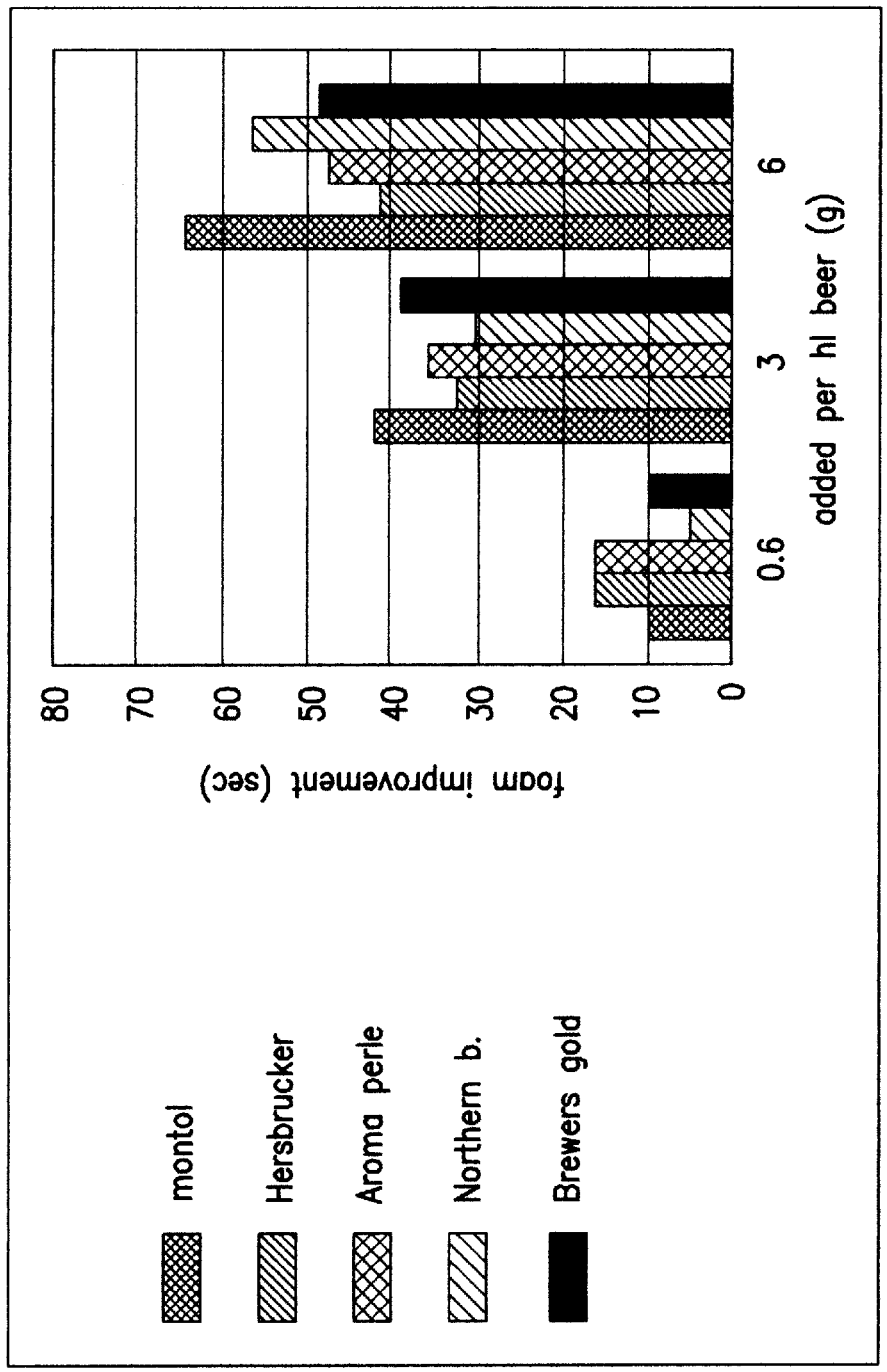
Figure 4:
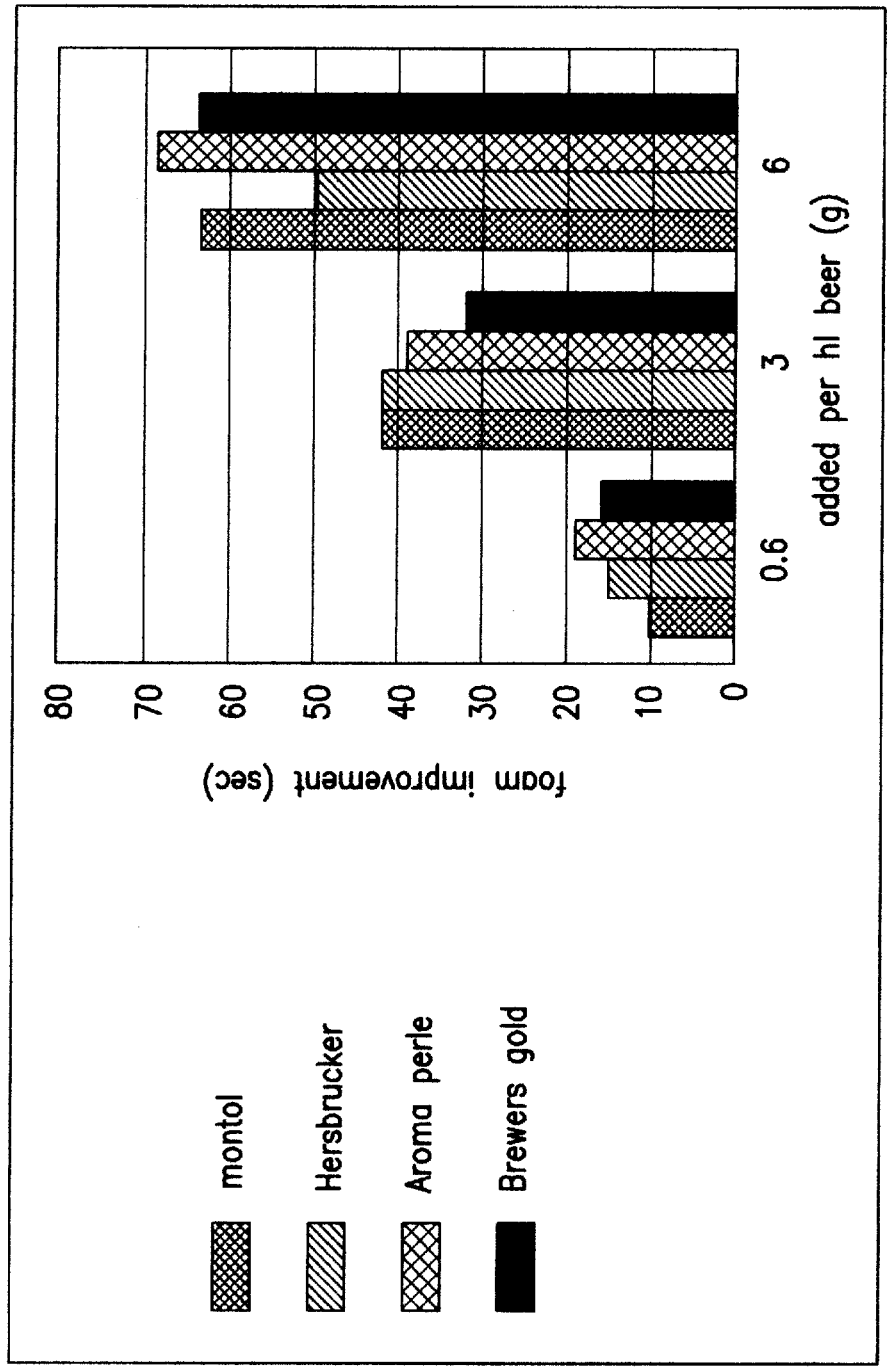
Figure 5:
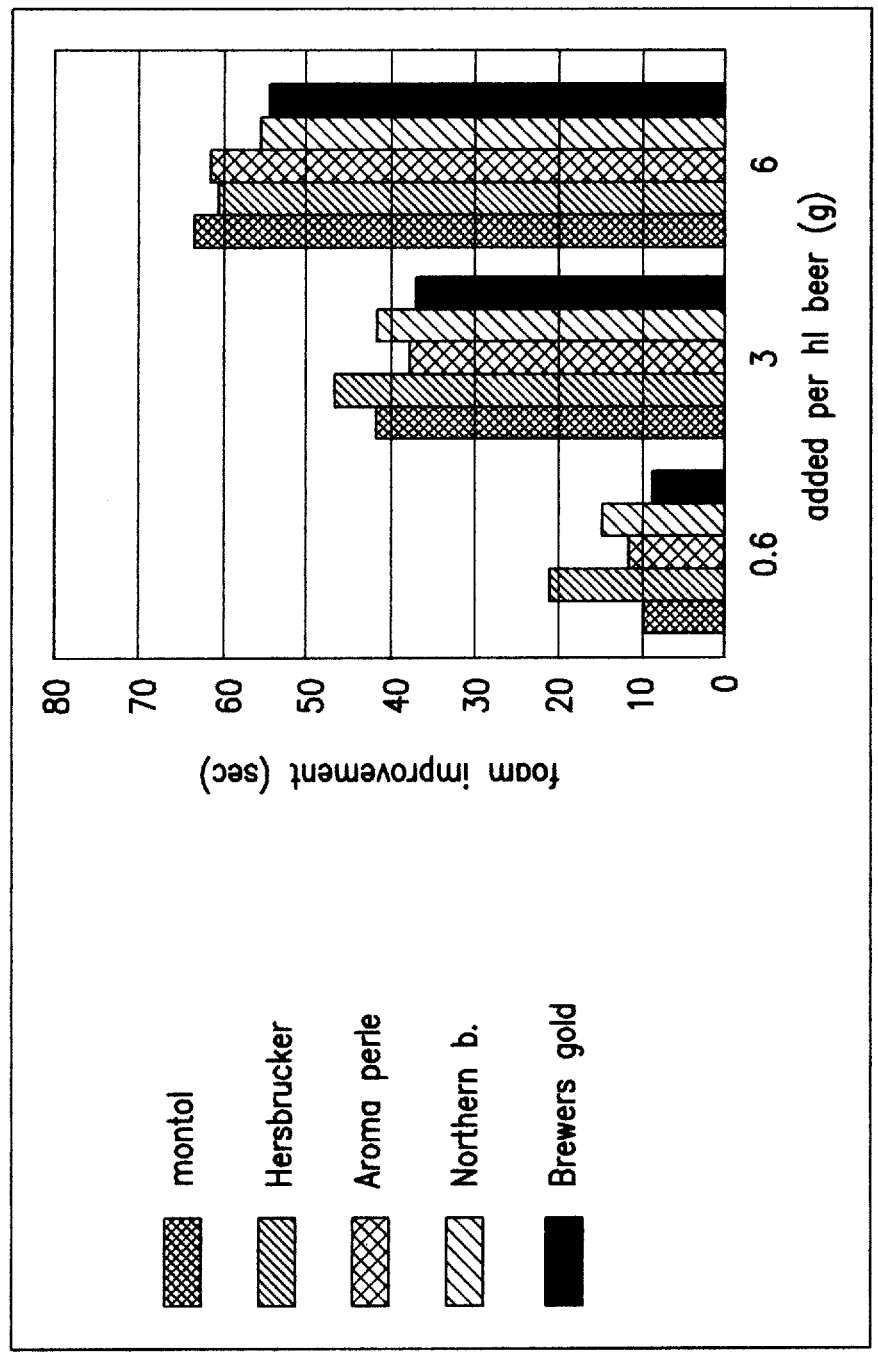

FIGS. 3–5 show the influence of the different hop pectin fractions on the foam stability of reference beer in comparison with commercial citrus pectin (DE 67%) and montol (in annex 4 the results are shown in tables). In these Figures, a purity of 60% for the pectin fractions was assumed. The concentration of the montol added was therefore also reduced to 60% to enable a good comparison between the two.

Figure 6:
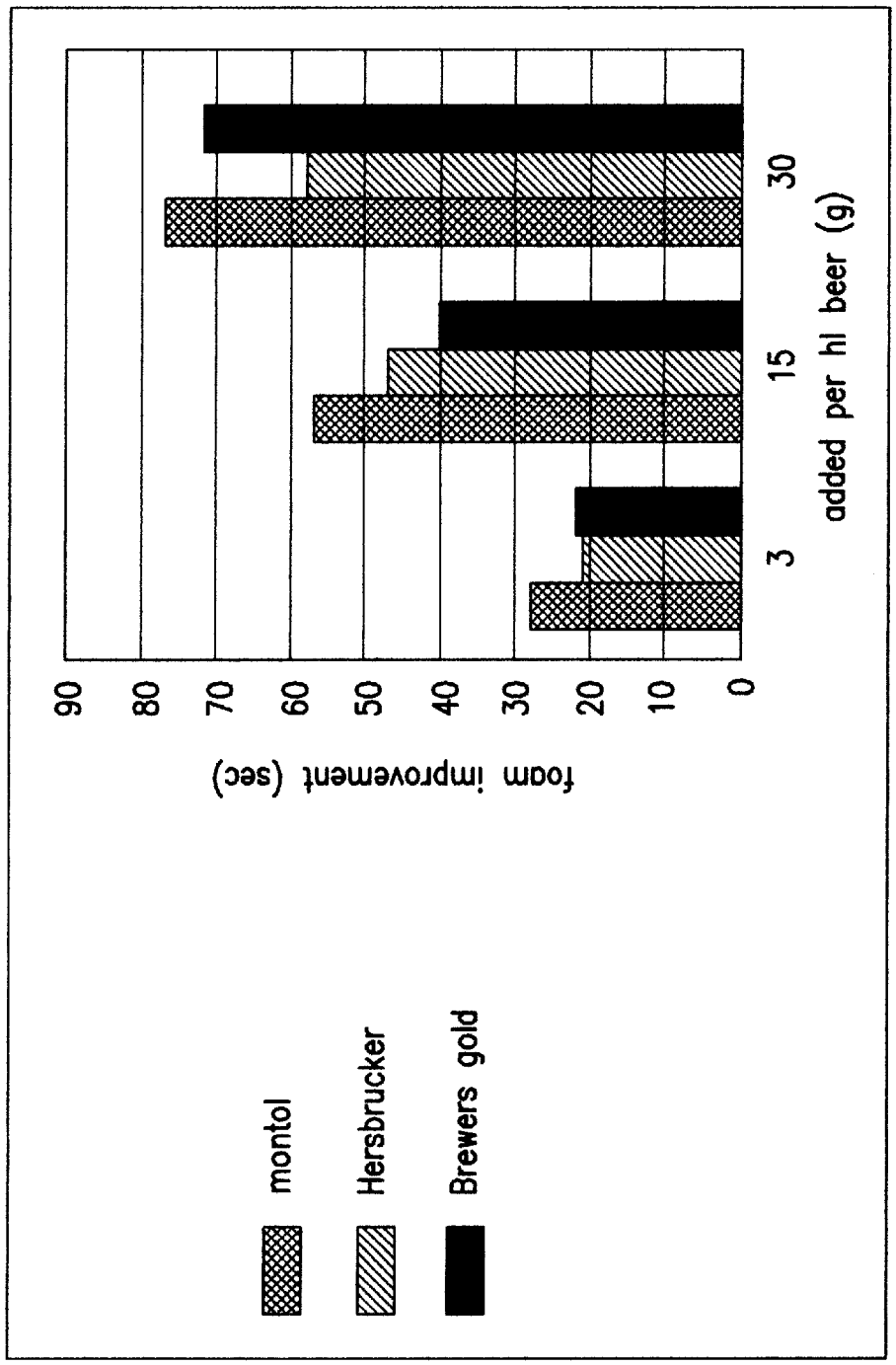

Bine pectin, hop cone pectin and montol give an almost equal foam stability after being added to reference beer. At an addition of 3 g/hl the foam improvement is approx. 40 sec. At a dosage of 3 g/hl, waste pectin gives an average foam improvement of 35 sec. To all pectin fractions it applies that the stabilization is variety-dependent. If the dosage of the pectin fractions is adjusted, so that 1, 5 and 10 g AUA/hl is dosed, the foam stability is not proportionally increased (see FIG. 6, in annex 5 the results are shown in tables). The fractions are only 60% pure on average, the other 40% may also consist of foam-negative components. If the dosage of the pectin fractions is increased, more foam-negative components may end up in the beer as well. In order to reduce or eliminate this problem, the fractions must be purified more.

Figures 1, 7:
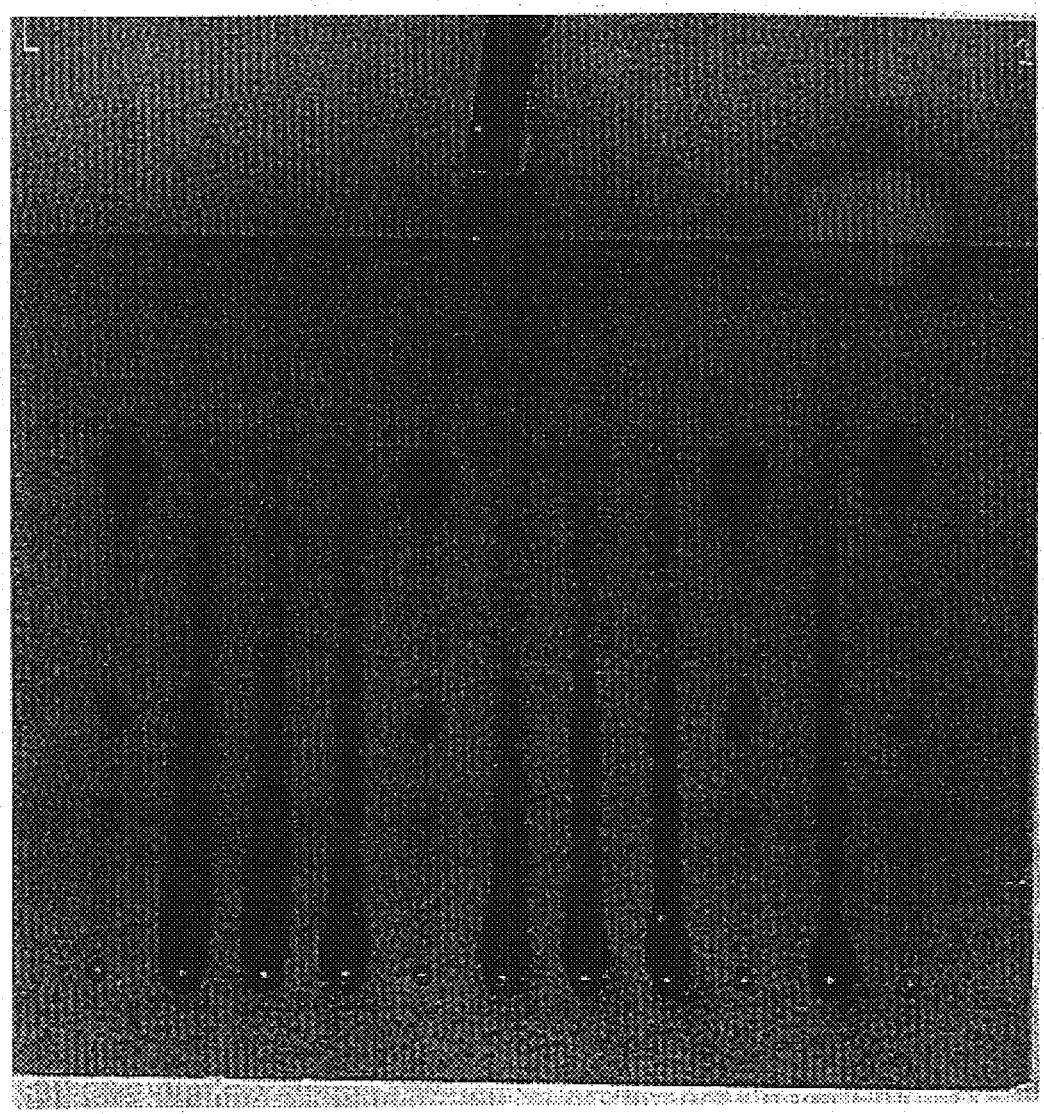
Figures 2, 7:
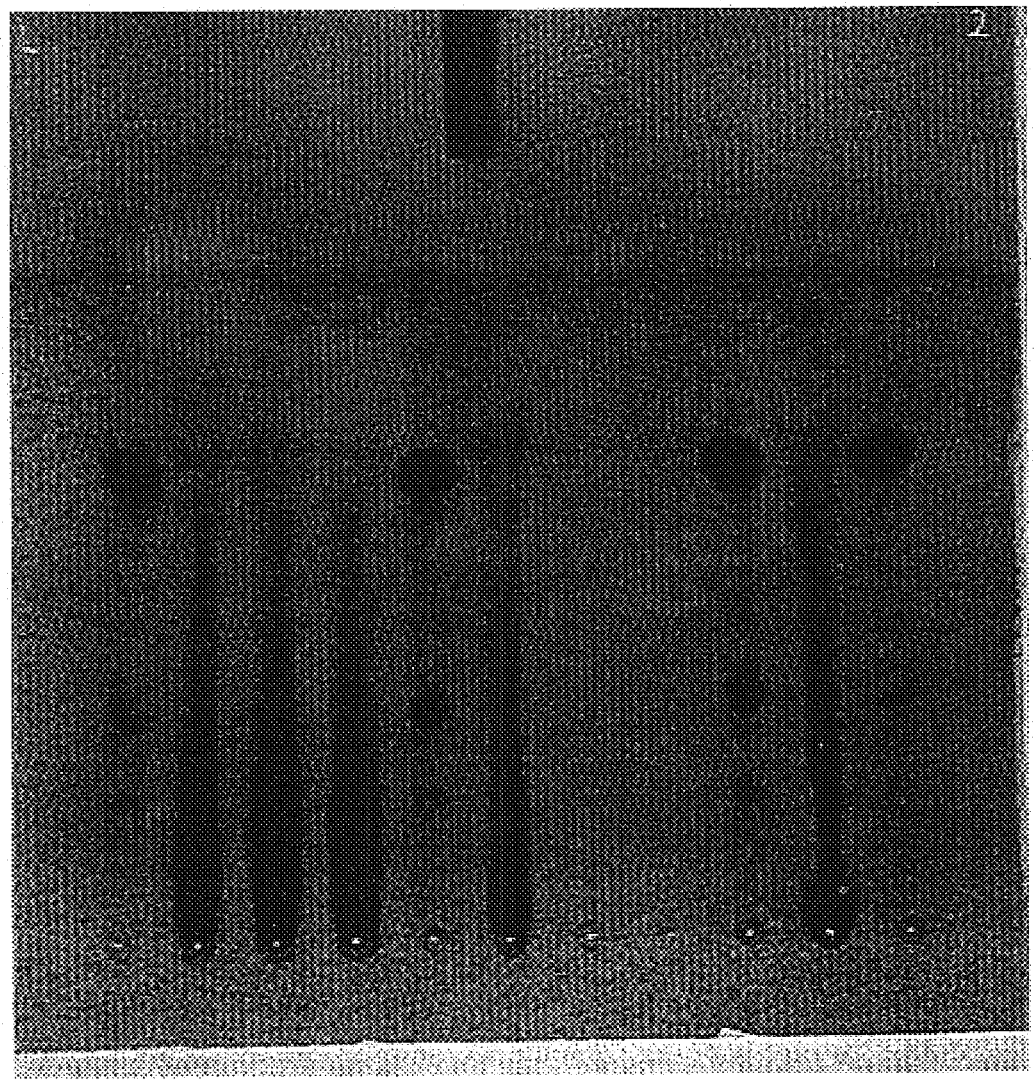

After the addition to water and beer it was investigated whether the isolated pectin fractions were detectable by means of the montol test. As a standard, mannuronic acid was included. FIG. 7 shows the chromatograms. This proves that according to this method, pectin is not detectable. The course of the standard beer is identical to that of standard beer to which hop pectin has been added.

2.4 Conclusions

Pectins can be extracted from the different parts of the hop plant (bines, cones). The pectin yield from leaves was too small for experiments. Sufficient pectin can, however, be extracted from the waste that is left behind in the field after harvesting. The purity (AUA content) of the pectin fractions proves to depend on the time of harvesting, the amount of material during purification and the hop variety. The average degree of esterification of the Dutch hop plants is 75% and of the German hop p ants 70%. Little difference is discernible between bines, cones or the waste. After addition to pilsner reference beer, "bine" and "hop cone" pectin yield the best foam improvements and these results are comparable with montol additions. An addition of 3 g pectin or montol per hl yields a foam improvement of approx. 40 sec.

Annex to Example 2
Annex 1 Pectin Extraction from Hops
1. Grinding the separate hop parts (cones, leaves, bines and the waste) (priorly freezing with nitrogen).
2. Adding warm water acidifying with HCl of pH 2.
3. Maintaining for 2 hours at 80° C. under constant agitation.
4. Filtering over cheese cloth.
5. Mixing the supernatant with alcohol 96% (1:2) without neutralizing.
6. Filtering over cheese cloth.
7. Washing out precipitate 2x with 60% alcohol. Washing out precipitate 1x with 96% alcohol (with intermediate fine-grinding with the ultraturrax).
8. Filtering over cheese cloth.
9. Drying overnight in Petri dish.

Annex 2 Determination of The Foam Influence of Pectins
1. Dried pectins were crushed and dissolved in 5 ml water under heating before being added to beer in the following concentrations: 3 mg/bottle (approx. 1 g/hl) 15 mg/bottle (approx. 5 g/hl). 30 mg/bottle (approx. 10 g/hl). For this purpose, the pectin fractions were assumed to be 100% pure. An experiment was conducted wherein the addition was based on the actual purity of the pectin fractions.
2. The bottles were shaken (50 rpm) for 48 hours (Dutch hops) or 60 hours (German hops).
3. Measurement of the foam stability with the Nibem meter.

ANNEX 3
RESULTS OF FOAM STABILITY AFTER ADDITION OF PECTINS TO BEER (PECTINS ISOLATED FROM DUTCH HOPS) - addition based on 100% purity

|  | Content added (g/hl) | Actual content AUA (g/hl) | Foam stability (sec) | Test minus control (sec) |
|---|---|---|---|---|
| commercial pectin | 1 | 1 | 273 | 16 |
| 29-9-93 | 5 | 5 | 276 | 19 |
| control 257 sec | 10 | 10 | 287 | 30 |
| 12-10-93 | 1 | 1 | 273 | 7 |
| control 267 sec | 5 | 5 | 285 | 18 |
|  | 10 | 10 | 296 | 29 |
| 28-10-93 | 1 | 1 | 296 | 8 |
| control 276 sec | 5 | 5 | 313 | 37 |
|  | 10 | 10 | 320 | 44 |
| bine A | 1 | 0.8 | 265 | 8 |
| 29-9-93 | 5 | 4 | 281 | 24 |
| control 257 sec | 10 | 8 | 285 | 28 |
| 28-10-93 | 1 | 0.8 | 275 | −1 |
| control 276 sec | 5 | 4 | 308 | 32 |
|  | 10 | 8 | 316 | 40 |
| bine B | 1 | 0.7 | 298 | 22 |
| 26-10-93 | 5 | 3.5 | 310 | 34 |
|  | 10 | 7 | 320 | 44 |
| bine C | 1 | 0.7 | 276 | 9 |
| 12-10-93 | 5 | 3.5 | 305 | 38 |
| control 267 sec | 10 | 7 | 318 | 51 |
| 28-10-93 | 1 | 0.7 | 283 | 7 |
| control 276 sec | 5 | 3.5 | 328 | 52 |
|  | 10 | 7 | — | — |
| cones A | 1 | 0.8 | 265 | 8 |
| 29-9-93 | 5 | 4 | 284 | 27 |
| control 257 sec | 10 | 8 | 284 | 27 |
| 28-10-93 | 1 | 0.8 | 265 | −9 |
| control 276 sec | 5 | 4 | 312 | 36 |
|  | 10 | 8 | 319 | 43 |
| cones B | 1 | 0.7 | 289 | 13 |
| 28-10-93 | 5 | 3.5 | 290 | 14 |
|  | 10 | 7 | 293 | 17 |
| cones C | 1 | 0.7 | 238 | −29 |
| 12-10-93 | 5 | 3.5 | 192 | −75 |
| control 267 sec | 10 | 7 | 180 | −87 |

-continued

ANNEX 3
RESULTS OF FOAM STABILITY AFTER ADDITION OF PECTINS TO BEER (PECTINS ISOLATED FROM DUTCH HOPS) - addition based on 100% purity

|  | Content added (g/hl) | Actual content AUA (g/hl) | Foam stability (sec) | Test minus control (sec) |
|---|---|---|---|---|
| 28-10-93 | 1 | 0.7 | 247 | −19 |
| control 276 sec | 5 | 3.5 | 215 | −61 |
|  | 10 | 7 | 192 | −84 |
| montol | 1 | 1 | 297 | 21 |
| 28-10-93 | 5 | 5 | 314 | 38 |
| control 276 sec | 10 | 10 | 340 | 64 |

ANNEX 4
RESULTS OF FOAM STABILITY AFTER ADDITION OF PECTINS TO BEER (PECTINS ISOLATED FROM GERMAN HOPS) - addition based on 100% purity

| Experiment 15-11-1993 | Content added (g/hl) | Actual content AUA (g/hl) | Foam stability (sec) | Test minus control (sec) |
|---|---|---|---|---|
| control water | — | — | 302 | — |
| control water | — | — | 306 | — |
| commercial | 1 | 1 | 323 | 19 |
| pectin | 5 | 5 | 337 | 33 |
|  | 10 | 10 | 356 | 52 |
| montol | 0.6 | 0.6 | 314 | 10 |
|  | 1 | 1 | 335 | 31 |
|  | 3 | 3 | 346 | 42 |
|  | 5 | 5 | 367 | 63 |
|  | 6 | 6 | 368 | 64 |
|  | 10 | 10 | 381 | 77 |
| bine 1 | 1 | 0.66 | 319 | 15 |
|  | 5 | 3.3 | 346 | 42 |
|  | 10 | 6.6 | 354 | 50 |
| bine 2 | 1 | 0.75 | 323 | 19 |
|  | 5 | 3.75 | 343 | 39 |
|  | 10 | 7.5 | 374 | 69 |
| bine 4 | 1 | 0.64 | 320 | 16 |
|  | 5 | 3.2 | 336 | 32 |
|  | 10 | 6.4 | 468 | 64 |
| cones 1 | 1 | 0.61 | 325 | 21 |
|  | 5 | 3.05 | 351 | 47 |
|  | 10 | 6.1 | 365 | 61 |
| cones 2 | 1 | 0.65 | 316 | 12 |
|  | 5 | 3.25 | 342 | 38 |
|  | 10 | 6.5 | 366 | 62 |
| cones 3 | 1 | 0.56 | 319 | 15 |
|  | 5 | 2.8 | 346 | 42 |
|  | 10 | 5.6 | 360 | 56 |
| cones 4 | 1 | 0.6 | 313 | 9 |
|  | 5 | 3 | 341 | 37 |
|  | 10 | 6 | 359 | 55 |
| waste 1 | 1 | 0.55 | 320 | 16 |
|  | 5 | 2.75 | — | — |
|  | 10 | 5.5 | 345 | 41 |
| waste 2 | 1 | 0.56 | 320 | 16 |
|  | 5 | 2.8 | 339 | 35 |
|  | 10 | 5.6 | 351 | 47 |
| waste 3 | 1 | 0.72 | 309 | 5 |
|  | 5 | 3.8 | 334 | 30 |
|  | 10 | 7.2 | 360 | 56 |
| waste 4 | 1 | 0.65 | 314 | 10 |
|  | 5 | 3.25 | 343 | 39 |
|  | 10 | 6.5 | 352 | 46 |

ANNEX 5
RESULTS OF FOAM STABILITY AFTER ADDITION OF
PECTINS TO BEER (PECTINS ISOLATED FROM GERMAN HOPS) -
addition based on purity measured

| Experiment 19-11-1993 | Content added (g/hl) | Actual content AUA (g/hl) | Foam stability (sec) | Test minus control (sec) |
|---|---|---|---|---|
| control water | | | 301 | — |
| bine 1 | 5.2 | 1 | 322 | 21 |
| | 31 | 5 | 348 | 47 |
| | 51 | 10 | 359 | 58 |
| bine 4 | 4.7 | 1 | 323 | 22 |
| | 23 | 5 | 341 | 40 |
| | 47 | 10 | 373 | 72 |
| montol | 1.8 | 1.8 | 311 | 10 |
| | 3 | 3 | 329 | 28 |
| | 9 | 9 | 343 | 42 |
| | 15 | 15 | 358 | 57 |
| | 18 | 18 | 369 | 68 |
| | 30 | 30 | 378 | 77 |

ANNEX 6
PURITY OF THE PECTIN FRACTIONS (AUA CONTENT)
AND DEGREE OF ESTERIFICATION (DE) OF THE
GERMAN HOP VARIETIES

| Sample | AUA (mg) | AUA (%) | DE (%) |
|---|---|---|---|
| pectin commercial | 285 | 95 | 69 |
| bine 1 | 146 | 66 | 76 |
| bine 2 | 227 | 75 | 70 |
| bine 4 | 192 | 64 | 73 |
| cone 1 | 183 | 61 | 69 |
| cone 2 | 194 | 65 | 75 |
| cone 3 | 164 | 56 | 72 |
| cone 4 | 181 | 60 | 68 |
| waste 1 | 164 | 55 | 75 |
| waste 2 | 167 | 56 | 77 |
| waste 3 | 225 | 72 | 70 |
| waste 4 | 195 | 55 | 77 |

EXAMPLE 3

3.1 Material

Residues of the following hop extracts were used:
A Ethanol extract residues
B $CO_2$ extract residues
C $CO_2$ extract residues
D Hexane extract residues.

For comparison, the foam-stabilization experiments were also conducted with commercial citrus pectin (DE 67%), montol and priorly purified pectin fractions from hop bines and hop cones (Example 2).

For the foam experiments reference beer was used.

3.2 Methods 3.2.1) Pectin Extraction

The ground residues were extracted with water (acidified to pH 2) to isolate pectin. The procedure followed is set forth in annex 1.

3.2.2) Determination of the Foam Influence of Pectin

The purified pectin fractions were added to beer in order to determine the influence thereof on the foam stability. The procedure is described in annex 2.

3.3 Results

From different hop suppliers residues were obtained that are left behind after the production of hop extracts. From these residues pectins were isolated. The yields are shown in Table 5. The yields of pectin from these residues are comparable with the yields from fresh material (cones and bines). Residues from $CO_2$ extracts were obtained from two suppliers and reveal different pectin yields. However, the extraction procedure for the two suppliers is not completely known and different hop varieties were used. Example 2 has shown that the variety influence the amount of pectin that can be isolated.

TABLE 5

Yield of pectin fractions purified from residues formed during the preparation of different hop extracts

| Sample | | Pectin yield (%) |
|---|---|---|
| residues ethanol extract | A | 2.3 |
| residues $CO_2$ extract | B | 1.8 |
| residues $CO_2$ extract | C | 2.5 |
| residues hexane extract | D | 2.4 |

Figure 8:
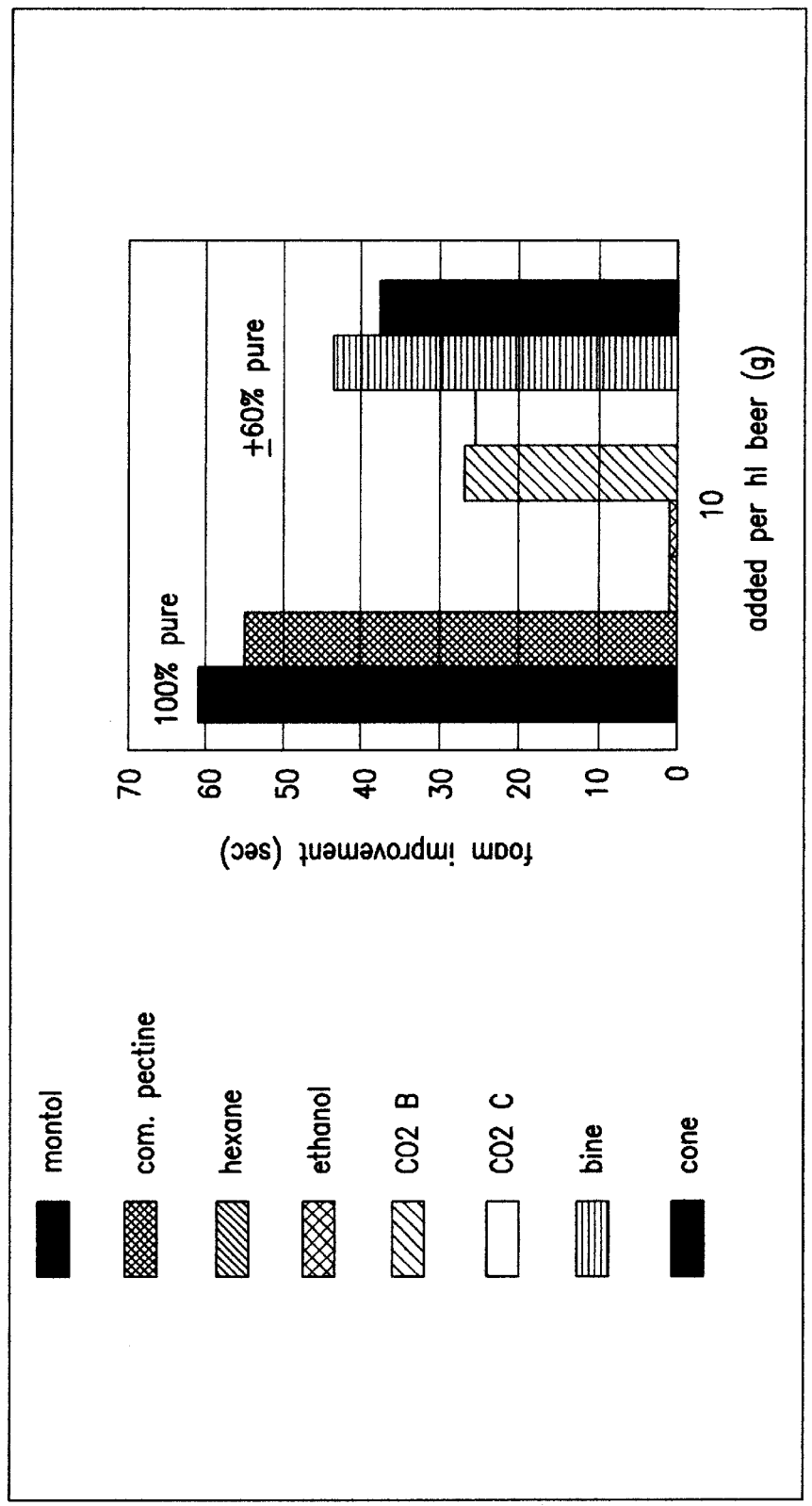

FIG. 8 shows the influence of the residual pectins on the foam stability of pilsner beer in comparison with commercial citrus pectin, montol and bine pectin (see Example 2). In annex 3 the results are given in tables. For dosing the pectin fractions 100% purity was assumed. However, the AUA content of the residual fractions will be lower (was not determined). For the comparison with montol, this should be taken into account.

The foam-stabilizing action of pectin from ethanol and hexane extract residues is not substantial. Beer to which these pectins were added exhibits a foam stabilization that is virtually equal to that of control beer. A positive effect can be observed after the addition of pectins from residues of $CO_2$ extracts. At an addition of 10 g pectin/hl, the foam improvement is 26 sec. The pectins from bine and cones (previous experiment) give an increase of 40 sec, however without corrections having been made for the purity of the fractions.

Annex 1 (to Example 3) Pectin Extraction from Hops

1 Grinding the different extracts (priorly freezing with nitrogen).
2 Adding warm water (water material ratio, see Table 4.1), acidifying with HCl to pH 2.
3 Maintaining for 2 hours at 80° under constant agitation. Filtering over cheese cloth. Mixing the supernatant with alcohol 96% (1:1.5) without neutralizing.
4 Filtering over cheese cloth.
5 Washing out precipitate 3x with 96% alcohol.
6 Filtering over cheese cloth.
7 Drying overnight in Petri dish.

Annex 2 (to Example 3) Determination of the Foam Influence of Pectins 1 dried pectins were crushed and dissolved in 5 ml water under heating before being added to beer in the following concentrations: 15 mg/bottle (approx. 5 g/hl) and 30 mg/bottle (approx. 10 g/hl). For this purpose, the pectin fractions were assumed to be 100% pure.
2 The bottles were shaken (50 rpm) at room temperature for 60 hours.
3 Measurement of the foam stability with the Nibem meter.

ANNEX 3
FOAM STABILITY OF BEERS TO WHICH DIFFERENT
PECTIN FRACTIONS WERE ADDED
(to Example 3)

| Sample | Amount added g/hl | Foam stability sec | Increased stability sec |
|---|---|---|---|
| Control | — | 280 | — |
| Control water | — | 300 | — |
| Residues hexane extract A | 10 | 294 | 0 |
| Residues $CO_2$ extract B | 5 | 302 | 2 |
| | 10 | 327 | 27 |
| Residues $CO_2$ extract C | 5 | 300 | 0 |
| | 10 | 326 | 26 |
| Residues ethanol extract D | 5 | 296 | 0 |
| | 10 | 298 | 0 |
| Montol | 5 | 345 | 45 |
| | 10 | 361 | 61 |
| Commercial pectin | 5 | 323 | 23 |
| | 10 | 355 | 55 |
| Bine 1 | 10 | 344 | 44 |
| Cones 1 | 10 | 338 | 38 |

What is claimed is:

1. A method for improving foam head stability in beer, comprising adding a hop extract containing at least 20% anhydrogalacturonic acid on a dry weight basis of extracted material, to a beer preparation after commencement of wort boiling and not earlier than 30 minutes before the end of wort boiling, said hop extract being added in an amount of at least 0.5 g per hectoliter of said beer preparation.

2. The method according to claim 1, wherein said hop extract is added not earlier than 10 minutes before the end of wort boiling.

3. The method according to claim 1, wherein said hop extract is added subsequent to wort boiling but prior to bright beer filtration.

4. The method according to claim 1, wherein said hop extract is added in an amount from 0.5 to 30 g per hectoliter.

5. The method according to claim 1, wherein said hop extract is made by extracting a by-product of a hop extraction process or by extracting hop bines.

6. The method according to claim 5, wherein said by-product is an extraction residue obtained from $CO_2$ extraction.

* * * * *